United States Patent [19]

Hilterhaus et al.

[11] 4,156,059
[45] May 22, 1979

[54] INORGANIC-ORGANIC POLYMERS AND PROCESSES FOR THEIR MANUFACTURE

[75] Inventors: Karl H. Hilterhaus, Georgsmarienhütte; Franz G. Reuter, Lemförde, both of Fed. Rep. of Germany

[73] Assignees: Chemie-Anlagenbau Bischofsheim GmbH; Reuter Technologie GmbH, both of Fed. Rep. of Germany

[21] Appl. No.: 697,992

[22] Filed: Jun. 21, 1976

[30] Foreign Application Priority Data

Jun. 28, 1975 [DE] Fed. Rep. of Germany ....... 2528898

[51] Int. Cl.$^2$ ..................... C08G 18/14; C08G 18/18; C08G 18/08
[52] U.S. Cl. ..................................... 521/117; 521/103; 521/164; 521/167; 528/48; 528/53; 528/85
[58] Field of Search ....... 260/2.5 AW, 2.5 A, 2.5 AJ, 260/75 NB, 77.5 AB, 77.5 NC, 77.5 R, 75 TN, 2.5 AE, 29.2 TN, 2.5 AB; 521/103, 117, 164, 167; 528/48, 53, 85

[56] References Cited

U.S. PATENT DOCUMENTS

| | | | |
|---|---|---|---|
| 2,911,379 | 11/1959 | Parker et al. | 260/2.5 AE |
| 3,635,848 | 1/1972 | Rambosek | 260/2.5 AB |
| 3,697,485 | 10/1972 | Rambosek et al. | 260/2.5 AW |
| 3,725,319 | 4/1973 | Frisch | 260/77.5 NC |
| 3,751,392 | 8/1973 | Olstonski | 260/2.5 AE |
| 3,763,057 | 10/1973 | Diehr | 260/2.5 AW |
| 3,816,307 | 6/1974 | Woods | 260/2.5 AJ |
| 3,865,760 | 2/1975 | Pitts et al. | 260/2.5 AJ |
| 3,868,350 | 2/1975 | Reiff et al. | 260/29.2 TN |
| 3,928,256 | 12/1975 | Cenker et al. | 260/2.5 AW |

FOREIGN PATENT DOCUMENTS

1396300  6/1975  United Kingdom ............... 260/2.5 AJ

OTHER PUBLICATIONS

DOS 2,105,193, Aug. 10, 1972, Reuter GmbH.
Hackh's Chemical Dictionary-3rd Edition, McGraw-Hill, N.Y. 1944, pp. 245 and 453.

*Primary Examiner*—H. S. Cockeram
*Attorney, Agent, or Firm*—Larson, Taylor and Hinds

[57] ABSTRACT

An organic-inorganic polymer for both porous and non-porous plastic products is produced by reacting a borate, in an aqueous alkaline solution, with a poly functional isocyanate.

18 Claims, No Drawings

INORGANIC-ORGANIC POLYMERS AND PROCESSES FOR THEIR MANUFACTURE

The invention relates to inorganic-organic polymers based on borates, and processes for their manufacture.

Surprisingly, it has been found, according to the invention, that when an alkaline borate solution is mixed homogeneously with a pseudohalide compound and the mixture is allowed to react completely, new products having excellent properties are obtained. Using the process according to the invention, the inorganic-organic polymers can be manufactured in the form of non-porous compositions or in the form of foams.

Accordingly, the invention relates to processes for the manufacture of inorganic-organic polymers, wherein an alkaline borate solution is mixed homogeneously with a pseudohalide compound, and the mixture is allowed to react completely.

The borate solution can be an aqueous and/or organic solution, to which a solubilizing agent has been added, if appropriate, in order to increase the borate concentration. Suitable solubilizing agents are in particular those compounds which are capable of forming a complex with the borates. These compounds may be of either inorganic or organic nature.

Amongst the organic complex-forming agents, polyols which contain at least two hydroxyl groups in adjacent positions or in which there is at most one further carbon atom between the carbon atoms carrying the hydroxyl groups are preferred. Suitable compounds of this nature include, for example, ethylene glycol, glycerol, mannitol, 1,2-dihydroxypropane, phenylglycol, pyrocatechol, monoethers of glycerol, 2,3-naphthalenediol, 1,8-naphthalenediol and 2-chloro-4-(1,1,3,3-tetramethyl-butyl)-6-hydroxymethyl-phenol.

Suitable inorganic solubilizing agents or complex-forming agents include, for example, the dichromates, or mixtures of a dichromate and an alkali metal hydrogen arsenate. These inorganic compounds are used preferably if it is intended to employ supersaturated aqueous borate solutions in accordance with the invention. Of course, it is also possible to employ, instead of the abovementioned dichromates, other suitable metal ions for stabilizing the supersaturated aqueous borate solution.

Preferably, the complex-forming agents are employed in approximately stoichiometric amounts, relative to the borates.

Amongst the large number of borates which can be employed according to the invention, sodium metaborate tetrahydrate, sodium tetraborate decahydrate, sodium pentaborate pentahydrate and disodium octaborate tetrahydrate, and their mixtures, are used in particular. Instead of the pure borate solutions, it is also possible to employ solutions of borates which have not previously been purified (crude borates) or the technical borate solutions obtained from the industrial manufacture of boron compounds. The technical borate solutions can in that case contain the impurities in a dissolved and/or dispersed form.

For special applications, it can be advantageous to employ a borate solution into which carbon dioxide has been passed beforehand, borate solutions into which the carbon dioxide has been passed until saturation is reached being preferred. The absorbed $CO_2$ not only promotes the formation of polyborates during the subsequent reaction but also serves as a blowing agent, since it is again liberated at temperatures of about 50° C. A cold saturated borate solution absorbs as much $CO_2$ as the sodium ions, contained therein, require for the formation of sodium carbonate. On heating the solution, the $CO_2$ is expelled. Since hydrogen sulfide and chlorine are absorbed in a similar manner to the carbon dioxide referred to above, it can be useful, for various purposes, to employ, according to the invention, a borate solution into which $H_2S$ or chlorine has been passed beforehand, if appropriate until saturation is reached.

The pseudohalides which can be employed according to the invention include compounds which are capable of chain lengthening and/or chain crosslinking, for example isocyanates and/or thioisocyanates with at least two isocyanate or thioisocyanate groups, thiocyanates, selenocyanates and tellurocyanates.

Preferably, isocyanate mixtures which predominantly contain polyisocyanate compounds with at least three isocyanate groups are employed according to the invention. Examples of these are the isocyanates commercially available under the registered tradenames "Desmodur 44 V" and "PAPI". The particularly preferentially employed polyisocyanate mixtures include the mixtures of polyisocyanates which contain practically no diisocyanates and monoisocyanates, such as are obtained in accordance with the process described in German Offenlegungsschrift (German Laid-Open Application) No. 2,105,193. In the process, an organic polyisocyanate mixture obtained by phosgenation of crude anilineformaldehyde resins, and predominantly containing the diphenylmethanediisocyanate isomers and higher-functional polyisocyanates with more than two benzene rings in the molecule, is separated into the diphenylmethanediisocyanate isomers and the higher-functional polyisocyanates.

Suitable organic diisocyanates include, for example, aliphatic diisocyanates, aromatic diisocyanates, alicyclic diisocyanates and heterocyclic diisocyanates, for example methylenediisocyanate, ethylenediisocyanate, propylenediisocyanate, butylenediisocyanate, cyclohexylene-1,4-diisocyanate, cyclohexylene-1,2-diisocyanate, tetramethylenediisocyanate or hexamethylenediisocyanate, arylenediisocyanates or their alkylation products, such as the phenylenediisocyanates, naphthylenediisocysnates, diphenylmethanediisocyanates, toluylenediisocyanates, di- or tri-isopropylbenzenediisocyanates, aralkyldiisocyanates, such as the xylylenediisocyanates, fluorine-substituted isocyanates, ethylene glycol diphenyl ether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3'-diisocyanate, fluorene-2,7-diisocyanate, anthraquinone-2,6-diisocyanate, pyrene-3,8-diisocyanate, chrysene-2,8-diisocyanate, 3'-methoxyhexane-diisocyanate, octane-diisocyanate, ω,ω'-diisocyanato-1,4-diethylbenzene, ω,ω'-diisocyanato-1,4-dimethylnaphthalene, cyclohexane-1,3-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzeneazonaphthalene-4,4'-diisocyanate, diphenyl ether-2,4-diisocyanate, diphenyl ether-4,4'-diisocyanate, and polyisocyanates containing isocyanurate groups.

Amongst these diisocyanates, 4,4'-diphenylmethanediisocyanate and/or its 2,4- and/or its 2,2'-isomer, 1,6-hexamethylenediisocyante, 2,4-toluylenediisocyanate and/or 2,5-toluylenediisocyanate and m-xylylenediisocyanate are preferred.

According to the invention, it is of course also possible to use the NCO preadducts employed for the manufacture of polyurethanes. The NCO preadducts are compounds of fairly high molecular weight which possess at least two terminal NCO groups and which preferably have a molecular weight of 500 to 10,000 and especially of from 800 to 2,500. Preferably, these NCO preadducts contain from 1.5 to 5% of NCO groups. These NCO preadducts are manufactured in a known manner, by reacting compounds of fairly high molecular weight, containing OH groups, with an excess of polyisocyanate. The manufacture of such NCO preadducts is described, for example, in Angewandte Chemie 64, 523 to 531 (1952), Kunststoffe 42, 303 to 310 (1952), German Patent Specification No. 831,772, German Patent Specification No. 897,014, German Patent Specification No. 929,507 and U.S. Pat. No. 3,000,757.

The following may be mentioned as examples of suitable compounds of fairly high molecular weight which contain OH groups and are suitable for the manufacture of the NCO preadducts: polyesters, polyethers, polyester-amides, polythioethers and polyacetals.

As polyols for the manufacture of the NCO preadducts it is possible to employ, for example, linear hydroxylic polyesters which contain terminal hydroxyl groups and which have been obtained either by polycondensation of ε-caprolactone or 6-hydroxycaproic acid or copolymerization of ε-caprolactone with dihydric alcohols or by polycondensation of dicarboxylic acids with dihydric alcohols.

The hydroxylic polyesters employed for the manufacture of the NCO preadducts can also be manufactured from dicarboxylic acids or mixtures of dicarboxylic acids with dihydric alcohols. Examples of suitable dicarboxylic acids include adipic acid, succinic acid, suberic acid, sebacic acid, oxalic acid, methyladipic acid, glutaric acid, pimelic acid, azelaic acid, phthalic acid, terephthalic acid, isophthalic acid, maleic acid, fumaric acid, citraconic acid and itaconic acid. Suitable dihydric alcohols or their mixtures, which are reacted with the dicarboxylic acids or ε-caprolactone to give the desired hydroxylic polyesters include, for example, ethylene glycol, propylene glycol, butylene glycols, for example 1,4-butanediol, butenediol and butinediol, bis(-hydroxymethylcyclohexane), diethylene glycol, 2,2-dimethylpropylene glycol and 1,3-propylene glycol.

The polyols preferentially employed for the manufacture of the NCO preadducts include polyesters based on adipic acid, 1,6-hexanediol and neopentyl glycol, having an average molecular weight of about 2,000 (Polyol 2,002, manufactured by Polyol-Chemie of Osnabrück, West Germany, hydroxyl number 56, acid number 1), polyesters based on polycaprolactone, having an average molecular weight of 2,000 (Niax Polyol D 560, manufactured by Union Carbide Corporation) and polyethers bearing the tradename "Polyol PTMG" of BASF, having an average molecular weight of 2,000.

Fairly high molecular weight compounds with terminal carboxyl, amino and mercapto groups are also suitable. Polysiloxanes which have groups which are reactive towards isocyanates may also be mentioned. Further customary compounds are described, for example, in J. H. Saunders and K. C. Frisch "Polyurethanes" Part 1, New York, 1962, pages 33 to 61, and in the literature cited there.

Any suitable organic diisocyanate can be used for the manufacture of the NCO preadducts, for example the diisocyanates mentioned above.

NCO preadducts with terminal isocyanate groups and containing carbon-carbon double bonds are easily obtainable by using exclusively, or in part, unsaturated polyesters for the manufacture of the NCO preadduct.

Isocyanate compounds which can be employed according to the invention which contain groups which either are ionic groups and/or behave as ionic groups in an alkaline reaction mixture, and the polymerizable compounds which can also be employed, are described, for example, in German Offenlegungsschriften (German Laid-Open Applications) No. 23 59 606, 23 59 608, 23 59 609, 23 59 610, 23 59 612, 23 10 559, 22 27 147 and 17 70 384. In part, the German Laid-Open Applications mentioned above also mention isocyanate compounds which do not carry ionic groups. These compounds are also suitable for the purposes of the invention.

Suitable catalysts are those of a type which is in itself known, for example tertiary amines, such as triethylamine, tributylamine, N-methyl-morpholine, N-ethyl-morpholine, N-coconut alkyl-morpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole and, in particular, also hexahydrotriazine derivatives.

Tertiary amines which contain hydrogen atoms which are active towards isocyanate groups are, for example, triethanolamine, triisopropanolamine, N-methyl-diethanolamine, N-ethyldiethanolamine, N,N-dimethyl-ethanolamine and their reaction products with alkylene oxides, such as propylene oxide and/or ethylene oxide.

Further suitable catalysts are sila-amines with carbon-silicon bonds, such as are described, for example, in German Patent Specification No. 1,229,290, for example 2,2,4-trimethyl-2-silamorpholine and 1,3-diethylaminomethyl-tetramethyldisiloxane.

Further suitable catalysts are nitrogen-containing bases such as tetraalkylammonium hydroxides, alkali metal hydroxides, such as sodium hydroxide, alkali metal phenolates, such as sodium phenolate, or alkali metal alcoholates such as sodium methylate. Hexahydrotriazines may also be employed as catalysts.

Organic metal compounds, especially organic tin compounds, can also be employed as catalysts according to the invention.

Preferred organic tin compounds are tin (II) salts of carboxylic acids, such as tin (II) acetate, tin (II) octoate, tin (II) ethylhexoate and tin (II) laurate, and the dialkyltin salts of carboxylic acids, such as, for example, dibutyltin diacetate, dibutyl-tin dilaurate, dibutyl-tin maleate or dioctyl-tin diacetate.

Further examples of catalysts which can be used according to the invention, and details of the mode of action of the catalysts, are described in the Kunststoff-Handbuch (Plastics Handbook), volume VII, edited by Vieweg and Hochtlen, Carl-Hanser-Verlag, Munich 1966, for example on pages 96 to 102.

The catalysts are as a rule employed in an amount of between about 0.001 and 10% by weight, based on the amount of isocyanate.

The catalysts preferentially employed according to the invention include those of the general formula

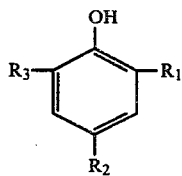

where the radicals $R_1$, $R_2$ and $R_3$ are hydrogen or a radical of the general formula

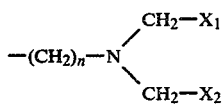

where n is an integer from 1 to 25 and the radicals $X_1$ and $X_2$ are hydrogen and/or alkyl radicals of 1 to 25 carbon atoms, and the radicals $R_1$, $R_2$ and $R_3$ can be different, but not more than two of the radicals $R_1$, $R_2$ or $R_3$ are hydrogen, and the alkyl radicals can carry primary and/or secondary hydroxyl groups.

It has been found, according to the invention, that it is advantageous to carry out the reaction in the additional presence of a compound which acts as a curing agent and lowers the pH value of the borate solution. Suitable compounds of this nature include ammonium chloride, barium chloride, barium nitrate, fuller's earths, disodium phosphate, calcium magnesium carbonate, calcium bromide, calcium chloride, calcium iodate, potassium aluminum sulfate, potassium bifluoride, potassium borofluoride, potassium bromide, potassium carbonate, potassium metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, sodium metabisulfite, sodium silicofluoride, sodium sulfite, tetrapotassium pyrophosphate, zinc acetate, zinc carbonate and boric acid.

When manufacturing foams in accordance with the process of the invention, it is preferred to employ the borate solutions containing carbon dioxide which have been described above. Instead of the "carbon dioxide blowing agent", or additionally thereto, it is possible to employ, as a blowing agent, inert liquids which boil between $-25°$ and $+50°$ C., preferably between $-15°$ and $+40°$ C. These are, in particular, alkanes, alkenes, halogen-substituted alkanes or alkenes or dialkyl ethers. Such substances are, for example, saturated or unsaturated hydrocarbons with 4 to 5 carbon atoms, such as isobutylene, butadiene, isoprene, butane, pentane and petroleum ether, and halogenated saturated or unsaturated hydrocarbons such as methyl chloride, methylene chloride, fluorotrichloromethane, difluorodichloromethane, trifluorochloromethane, chloroethane, vinyl chloride and vinylidene chloride. Trichlorofluoromethane, vinyl chloride and $C_4$ hydrocarbons, for example butane, have proved most suitable.

The blowing agents are employed in amounts of 0–50% by weight, preferably 2–30% by weight, based on the reaction mixture.

Of course, when manufacturing the foam at an elevated temperature, higher-boiling blowing agents can also be used as an additive, for example hexane, dichloroethane, trichloroethane, carbon tetrachloride or light gasoline. However, the water contained in the mixture can also act as the blowing agent. Furthermore, fine metal powders, for example calcium, magnesium, aluminum or zinc, can act as the blowing agent by evolving hydrogen through reaction with sufficiently alkaline waterglass, and at the same time exert a curing and reinforcing effect.

In order to form a particularly fine cell structure it is advisable to admix nucleating and cell-regulating substances. Numerous compounds are suitable for use as a nucleating substance, examples being finely divided inert solids, for example silicon dioxide or aluminum oxide, if appropriate together with zinc stearate, or amorphous silicic acids or metal silicates. Amongst these, silicon dioxide precipitated from colloidal solution is preferred as a nucleating agent.

Suitable cell regulators include silicone oils based on polysiloxanes, for example the oils DC-193, DC-194, DC-195, L-532 and L-5340 from Union Carbide Corporation, the oils SF 1066 and SF 1109 from General Electric, the DC grades from Wacker, the Tegiloxan grades from Goldschmidt and Eumulgin 286 from Henkel. Amongst these, DC-195, L-5340 and Eumulgin 286 are preferred.

Preferably, surface-active additives are also used when manufacturing the organic-inorganic foams according to the invention, so as to facilitate foaming by reducing the surface tension of the system. In addition, the surface-active additives impart certain desirable properties to the organic-inorganic foams, through additionally influencing the cell structure. Suitable compounds include, for example, surfactants (commercially available under the name Eumulgin 286, manufactured by Henkel) as well as the non-ionic alkylphenol oxyethylates having a degree of oxyethylation of about 6 to 20. The use of Eumulgin 286 and of alkylphenol oxyethylates having a degree of oxyethylation of 9 to 10 is preferred.

The surface-active additives can at the same time also act as foam stabilizers. In addition, the following may be employed as foam stabilizers: silicone oil (commercially available under the name Si L 5340, manufactured by Union Carbide Corporation) and Eumulgin 286 from Henkel.

In order further to lower the flammability of the organic-inorganic foams of the invention, flameproofing substances are added to the system, preferably to the borate solution. These substances can be dissolved or dispersed in the borate solution. The flameproofing substances which are soluble in borate solutions include, for example, trisodium phosphate.$12H_2O$. The additives which are insoluble in borate solutions and which furthermore at the same time also act as reinforcing agents include, for example, kieselguhr (diatomaceous earth), hydrated aluminum oxide, magnesium silicate, asbestos powder, chalk, asbestos fibers and glass fibers.

In principle the inorganic-organic polymers of the invention can be filled with substantial amounts of fillers without losing their pattern of high-performance properties; very particularly preferred fillers, which exhibit a marked reinforcing action, are water-binding (hydraulic) additives of organic or inorganic nature, especially hydraulic cements, synthetic anhydrite, gypsum and quicklime.

If sufficient amounts of such water-binding additives are used, even aqueous solutions which have a high water content, for example 60-90%, can be employed for forming the xerosol.

Hydraulic cements which can be employed are, in particular, Portland cement, quick-setting cement, blast furnace cement, lightly burned cement, sulfate-resistant cement, masonry cement, natural cement, lime cement, gypsum cement, pozzolan cement and calcium sulfate cement.

The water-binding additives are employed to manufacture hard materials and are preferably used in an amount which suffices to bind 40-100% of the water introduced with the aqueous phase. In particular, the amount of the water-binding additives is 50 to 400% by weight of the amount of "total mixture" (sum of the 2 main components).

Fillers and inert additives can, before mixing, also be steeped in, or impregnated or sprayed with, one of the liquid components of the mixture, for example in order to improve the adhesion or flow.

The bonding of the water, introduced by the aqueous phase, by means of hydraulic binders, especially cement, lime or anhydrite, is of considerable importance from the point of view of the behavior of the materials in the event of a fire. On exposure to heat, the water is slowly released endothermically and hence exerts a powerful fire-retardant action.

The amount of additives introduced depends above all on the viscosity of the mixture. Preferably, the amount of additives introduced is between 0.1 and 20% by weight, relative to the weight of the borate solution employed. In addition to these flameproofing additives or fillers, it is of course possible also to add pigments or dyes to the mixture which is to be foamed, if colored products are desired.

Further examples of surface-active additives and foam stabilizers, cell regulators, reaction retarders, stabilizers, flameproofing substances, plasticizers, dyes, fillers, fungistatic materials and bacteriostatic materials, which, according to the invention, are added optionally, and details regarding the method of use and mode of action of these additives, are described in the Kunststoff-Handbuch (Plastics Handbook), volume VI, edited by Vieweg and Hochtlen, Carl-Hanser-Verlag, Munich 1966, for example on pages 103 to 113.

Depending on the properties which the organic-inorganic foams according to the invention are to exhibit, it is possible to employ, as additional reactants, polyesters and polyethers such as are employed in polyurethane chemistry, and such as have, in part, already been described above in conjunction with the manufacture of the NCO preadducts which can be employed according to the invention. Since the polyols, that is to say the polyesters and polyethers, have been described in great detail in the polyurethane literature, a closer description of these compounds will be dispensed with here.

Furthermore, particles of plastics, preferably in the form of an aqueous dispersion of a plastic, can also be introduced into the reaction mixture according to the invention. Suitable dispersions of plastics include, for example, those which are commercially available under the registered tradenames Oppanol (a product of BASF) and Lutofan (a product of BASF).

The components mentioned above are mixed in the manner known from polyurethane chemistry. As usual, a component A and a component B are first prepared, and these are then mixed after addition of appropriate adjuvants and catalysts. The start time of the mixtures, for the production of foams, prepared in this way is in general between 5 seconds and 100 seconds or more, and can be regulated as desired. If required, the components can be warmed to reduce the start time. Preferably, the organic-inorganic foams according to the invention have a density of between 15 and 750 kg/m$^3$.

The ratio of the solids contents of the sodium borate solution and/or potassium borate solution to the isocyanate groups employed is in the range from 0.1 to 6, based on the percentage proportion of NCO groups and the dry weight of the borate solution. The range from 0.1 to 6 is a preferred range and other solids content ratios are also possible.

For special applications it can be of advantage if the inorganic-organic polymers obtained according to the invention are subjected to a subsequent heat treatment at temperatures above 100° C., especially above 130° and up to 250° C.

As regards the complex-forming agents employed according to the invention, it should be stated, as a general remark, that those capable of forming five-membered and six-membered rings are suitable. Five-membered rings are formed, for example, if two adjacent OH groups are present on the complex-forming agent, as is the case, for example, with glycols, triols and sugar alcohols. In addition, the oxalato, glycino and ethylenediaminetetraacetic acid complexes can also be employed.

Six-membered rings are formed when the complex-forming agent contains a double bond. Such complexes include, for example, acetylacetonato and salicylato complexes.

Furthermore, quadridentate ligands, which form both six-membered and five-membered rings, can also be employed. An example is the bis-(acetylacetone)-ethylenediimine complex.

Complexes which, because of the absence of an ion, are externally electrically neutral, are thus preferred.

The examples which follow illustrate the invention without however limiting it thereto. Unless stated otherwise, percentages and parts are by weight.

EXAMPLE 1

Manufacture of a foam (a) Manufacture of the starting component BP-2

140 parts by weight of glycerol (99.5% strength, DAB (German Pharmacopeia) 6) are first introduced into a stirred apparatus equipped with a reflux condenser. 60 parts by weight of $Na_2B_4O_7$ are added whilst stirring. The mixture is warmed to 80° C. and 10 parts by weight of water are added three times in the course of 10 minutes. The mixture is then boiled under reflux until a clear light brown solution has formed.

(b) A so-called A-component is prepared by thoroughly stirring 40 parts by weight of component BP-2 with 5 parts by weight of water, 3 parts by weight of 2,4,6-tris-(dimethylaminomethyl)-phenol and 1 part by weight of diatomaceous earth (Celatom MW31 from Chemag).

(c) A so-called B-component is prepared by mixing 15 parts by weight of polyisocyanate (Desmodur 44V20 from Bayer AG) with 10 parts by weight of a phosphonate ester (Phosgard 2xC20 from Monsanto), 10 parts by weight of diatomaceous earth (Celatom MW31 from Chemag), 0.3 part by weight of silicone oil (193 from Dow Corning) and 8 parts by weight of trichlorofluoromethane.

(d) The two components A and B are mixed for 10 seconds in a ratio of A:B=0.5, using a high speed stirrer. After 65 seconds, the homogeneous mass begins to foam up. The foam, which initially is able to flow, cures completely after about 5 minutes. The density after drying out is about 73 kg/m$^3$.

EXAMPLE 2

Example 1 is carried out with the modification that components A and B are mixed in the ratio of A:B=1. After 55 seconds, the mixture begins to foam up. The density of the dry foam is 71 kg/m$^3$.

EXAMPLE 3

Example 1 is carried out with the modification that components A and B are mixed in the ratio of A:B=2. After 100 seconds, the mixture begins to foam up. The density of the dry foam is 87 kg/m$^3$.

EXAMPLE 4

Manufacture of a foam (a) Manufacture of the starting component BP-2

140 parts by weight of glycerol (99.5% strength, DAB (German Pharmacopeia) 6) are first introduced into a stirred apparatus equipped with a reflux condenser. 60 parts by weight of $Na_2B_4O_7$ are added whilst stirring. The mixture is warmed to 80° C. and 10 parts by weight of water are added three times in the course of 10 minutes. The mixture is then boiled under reflux until a clear light brown solution has formed.

(b) A so-called A-component is prepared by thoroughly stirring 40 parts by weight of component BP-2 with 7 parts by weight of water, 3 parts by weight of 2,4,6-tris-(dimethylaminomethyl)-phenol and 1 part by weight of diatomaceous earth (Celatom MW31 from Chemag).

(c) A so-called B-component is prepared by mixing 15 parts by weight of polyisocyanate (Desmodur 44V20 from Bayer AG) with 10 parts by weight of a phosphonate ester (Phosgard 2xC20 from Monsanto), 10 parts by weight of diatomaceous earth (Celatom MW31 from Chemag), 0.3 part by weight of silicone oil (193 from Dow Corning), 15 parts by weight of sodium silicofluoride and 8 parts by weight of trichlorofluoromethane.

(d) The two components A and B are mixed for 30 seconds in a ratio of A:B=1, using a high speed stirrer. After 55 seconds, the homogeneous mass begins to foam up. The foam, which initially is able to flow, cures completely after about 5 minutes. The density after drying out is 52 kg/m$^3$.

EXAMPLE 5

Manufacture of a foam (a) Manufacture of the starting component BP-1

250 parts by weight of glycerol (99.5% strength, DAB (German Pharmacopeia) 6) are first introduced into a stirred apparatus equipped with a reflux condenser. 250 parts by weight of $Na_2B_4O_7.10H_2O$ are added whilst stirring. The mixture is warmed to 120° C. The mixture is then boiled under reflux until a clear light brown solution has formed.

(b) A so-called A-component is prepared by thoroughly stirring 40 parts by weight of component BP-1 with 6 parts by weight of water, 3 parts by weight of 2,4,6-tris-(dimethylaminomethyl)-phenol and 3 parts by weight of diatomaceous earth (Celatom MW31 from Chemag).

(c) A so-called B-component is prepared by mixing 15 parts by weight of polyisocyanate (Desmodur 44V20 from Bayer AG) with 10 parts by weight of a phosphonate ester (Phosgard 2xC20 from Monsanto), 0.3 part by weight of silicone oil (193 from Dow Corning) and 11 parts by weight of trichlorofluoromethane.

(d) The components A and B are mixed for 10 seconds in a ratio of A:B=1, using a high speed stirrer. After 15 seconds, the homogeneous mass begins to foam up. The foam, which initially is able to flow, cures completely after about 5 minutes. The density after drying out is about 92 kg/m$^3$.

EXAMPLE 6

Manufacture of a foam (a) Manufacture of the starting component BP-3

100 parts by weight of water are initially introduced into a stirred apparatus. 30 parts by weight of $Na_2B_8O_{13}.4H_2O$ are added whilst stirring. The mixture is warmed to 50° C. and is stirred until a clear supersaturated solution has been produced.

(b) A so-called A-component is prepared by thoroughly stirring 40 parts by weight of component BP-3, whilst it is still warm, with 5 parts by weight of water, 3 parts by weight of 2,4,6-tris-(dimethylaminomethyl)-phenol and 1 part by weight of diatomaceous earth (Celatom MW31 from Chemag).

(c) A so-called B-component is prepared by mixing 15 parts by weight of polyisocyanate (Desmodur 44V20 from Bayer AG) with 10 parts by weight of a phosphonate ester (Phosgard 2xC20 from Monsanto), 10 parts by weight of diatomaceous earth (Celatom MW31 from Chemag), 0.3 part by weight of silicone oil (193 from Dow Corning) and 8 parts by weight of trichlorofluoromethane.

(d) The two components A and B are mixed for 10 seconds in a ratio of A:B=1, using a high speed stirrer. After an induction time, the homogeneous mass begins to foam up. The foam, which initially flows, then cures.

What is claimed is:

1. A process for preparing an inorganic-organic polymer comprising the steps of:
   providing a reaction mixture in which the reactants consist essentially of an aqueous alkaline borate solution and a polyfunctional organic isocyanate, the ratio of the borate to the isocyanate being in the range of 0.1 to 6 based on the dry weight percent of the borate and the NCO groups present in the polyfunctional isocyanate; and
   effecting reaction between said borate and said isocyanate to form an inorganic-organic polymer reaction product consisting essentially of said borate and said isocyanate.

2. A process as claimed in claim 1, wherein a supersaturated aqueous borate solution is employed, to which metal ions have been added as a stabilizer.

3. A process as claimed in claim 1, wherein the borate employed is sodium metaborate tetrahydrate, sodium tetraborate decahydrate, sodium pentaborate pentahydrate or disodium octaborate tetrahydrate.

4. A process as claimed in claim 1, wherein a technical borate solution is employed as the borate solution.

5. A process as claimed in claim 1, wherein a borate solution is employed into which carbon dioxide has been passed beforehand.

6. A process as claimed in claim 1, wherein said polyfunctional isocyanate comprises a mixture of higher-functional polyisocyanates with more than two benzene rings in the molecule.

7. A process as claimed in claim 1, wherein the isocyanate compound contains groups which either are ionic groups or behave as ionic groups in the alkaline reaction medium.

8. A process as claimed in claim 1, wherein an isocyanate compound which is halogenated or sulfonated, is employed.

9. A process as claimed in claim 1, wherein the reaction is carried out in the presence of a blowing agent.

10. A process as claimed in claim 1, wherein the reaction is carried out in the presence of an organic catalyst which is soluble in the alkaline borate solution.

11. A process as claimed in claim 10, wherein the catalyst employed has the general formula

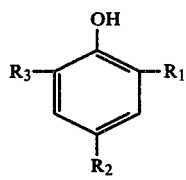

where the radicals $R_1$, $R_2$ and $R_3$ are hydrogen or a radical of the general formula

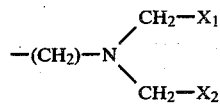

where n is an integer from 1 to 25 and the radicals $X_1$ and $X_2$ are hydrogen or alkyl radicals of 1 to 25 carbon atoms, the radicals $R_1$, $R_2$ and $R_3$ can be different, but not more than two of the radicals $R_1$, $R_2$ or $R_3$ are hydrogen, and the alkyl radicals can carry primary or secondary hydroxyl groups.

12. A process as claimed in claim 1, wherein the reaction is carried out in the presence of a filler a flame-proofing agent, a pigment, a foam stabilizer or a curing agent.

13. A process according to claim 1 wherein said aqueous alkaline borate solution comprises a solubilizing agent for increasing the borate concentration.

14. A process according to claim 13 wherein said solubilizing agent comprises a compound capable of forming a complex with said borate.

15. A process as claimed in claim 14, wherein the complex-forming agent used is a polyol which contains two hydroxyl groups in adjacent positions or in which there is at most one further carbon atom between the carbon atoms carrying the hydroxyl groups.

16. A process as claimed in claim 14, wherein the complex-forming agent is employed in approximately stoichiometric amount, based on the borate.

17. A process according to claim 1 wherein said isocyanate comprises a pre-adduct having a molecular weight of 500 to 10,000, having terminal isocyanate groups, and containing from 1.5% to 5% of isocyanate groups.

18. An inorganic-organic polymer produced by the process of claim 1.